United States Patent
Childers et al.

(10) Patent No.: US 6,832,839 B2
(45) Date of Patent: Dec. 21, 2004

(54) SYSTEM FOR ENHANCING THE QUALITY OF AN IMAGE

(75) Inventors: Winthrop D. Childers, San Diego, CA (US); William J. Allen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 14 days.

(21) Appl. No.: 10/699,435

(22) Filed: Oct. 31, 2003

(65) Prior Publication Data

US 2004/0090604 A1 May 13, 2004

Related U.S. Application Data

(63) Continuation of application No. 10/114,645, filed on Apr. 1, 2002, now Pat. No. 6,729,734.

(51) Int. Cl.[7] .................. G03B 21/00; G03B 21/14; G03B 21/56; G03B 3/00; H04N 9/12
(52) U.S. Cl. .................. 353/122; 353/101; 353/69; 353/94; 353/99; 348/742; 348/743; 359/443; 345/88; 362/282
(58) Field of Search .................. 353/101, 122, 353/69, 94, 99; 348/742, 743; 359/443; 345/88; 362/282

(56) References Cited

U.S. PATENT DOCUMENTS

| | | |
|---|---|---|
| 3,603,722 A | 9/1971 | Graham |
| 4,759,605 A | 7/1988 | Shen et al. ............... 350/96.15 |
| 5,274,492 A | 12/1993 | Razzaghi .................. 359/202 |
| 5,633,755 A | 5/1997 | Manabe et al. ............. 359/443 |
| 5,661,546 A | 8/1997 | Taniguchi .................. 355/533 |
| 5,777,589 A | 7/1998 | Gale et al. .................. 345/84 |
| 5,795,058 A | 8/1998 | Owen ........................ 362/293 |
| 5,934,778 A | 8/1999 | Shioya ....................... 353/31 |
| 5,993,009 A | 11/1999 | Choate ....................... 353/80 |
| 6,048,080 A | 4/2000 | Belliveau .................. 362/282 |
| 6,100,862 A | 8/2000 | Sullivan .................... 345/88 |
| 6,183,092 B1 | 2/2001 | Troyer ....................... 353/31 |
| 6,220,730 B1 | 4/2001 | Hewlett et al. ............. 362/297 |
| 6,231,190 B1 | 5/2001 | Dewald ....................... 353/31 |
| 6,243,057 B1 | 6/2001 | Blaxtan et al. .............. 345/84 |
| 6,246,446 B1 | 6/2001 | Heimbuch et al. ........... 348/750 |
| 6,264,333 B1 | 7/2001 | Iizuka ....................... 353/101 |
| 6,267,478 B1 | 7/2001 | Chen ......................... 353/84 |
| 6,280,035 B1 | 8/2001 | Tadic-Galeb et al. ........ 353/31 |
| 6,293,680 B1 | 9/2001 | Bruns ........................ 359/849 |
| 6,304,316 B1 | 10/2001 | Jain et al. ................... 353/53 |
| 6,327,007 B1 | 12/2001 | Shim ......................... 349/54 |
| 6,416,185 B1 | 7/2002 | Smith ........................ 353/69 |
| 6,457,833 B1 | 10/2002 | Ishikawa et al. ............. 353/99 |

Primary Examiner—Alan A. Mathews
Assistant Examiner—Melissa J Koval

(57) ABSTRACT

A system for enhancing the quality of an image on a screen is provided. The system typically includes an illumination source configured to produce light and direct such light along an optical path, and a time-varying focus device disposed in the optical path and configured to periodically alter incident light to enhance the quality of the image on the screen.

23 Claims, 5 Drawing Sheets

SYSTEM FOR ENHANCING THE QUALITY OF AN IMAGE

This is a continuation of application number 10/114,645 filed on Apr. 1, 2002, now U.S. Pat. No. 6,729,734 which is hereby incorporated by reference herein and then converge light of sequential image frames.

BACKGROUND OF THE INVENTION

Various display systems and display methods have been used over the years to generate images. For example, both front and rear projection systems are used today to display images. Such display systems may employ image devices, such as cathode ray tubes (CRTs), liquid crystal displays (LCDs), or electrically-addressed emissive displays, e.g. plasma displays. The display systems further may incorporate a passive display screen or an active display screen.

The marketability of each display system depends on numerous factors, including, but not limited to, image quality, image resolution, image brightness, display size, cost, weight, design, etc. A consumer may choose a display system based on any one factor, or any combination of these factors. For example, the level of shading or half-toning may be important to a consumer when the display system is primarily used to display graphical or photographic images. Edge definition and contrast also may be important. A consumer may want a display system having both high quality shading and high quality edge definition. However, until now, the cost of display systems that attempt to provide both high quality half-toning and high quality edge definition has been prohibitive.

SUMMARY OF THE INVENTION

A system for enhancing the quality of an image on a screen is provided. The system typically includes an illumination source configured to produce light and direct such light along an optical path, and a variable focus device disposed in the optical path and configured to sequentially alter incident light to enhance the quality of the image on the screen.

DETAILED DESCRIPTION OF THE PREFERRED EMBODIMENT

Figure 1:
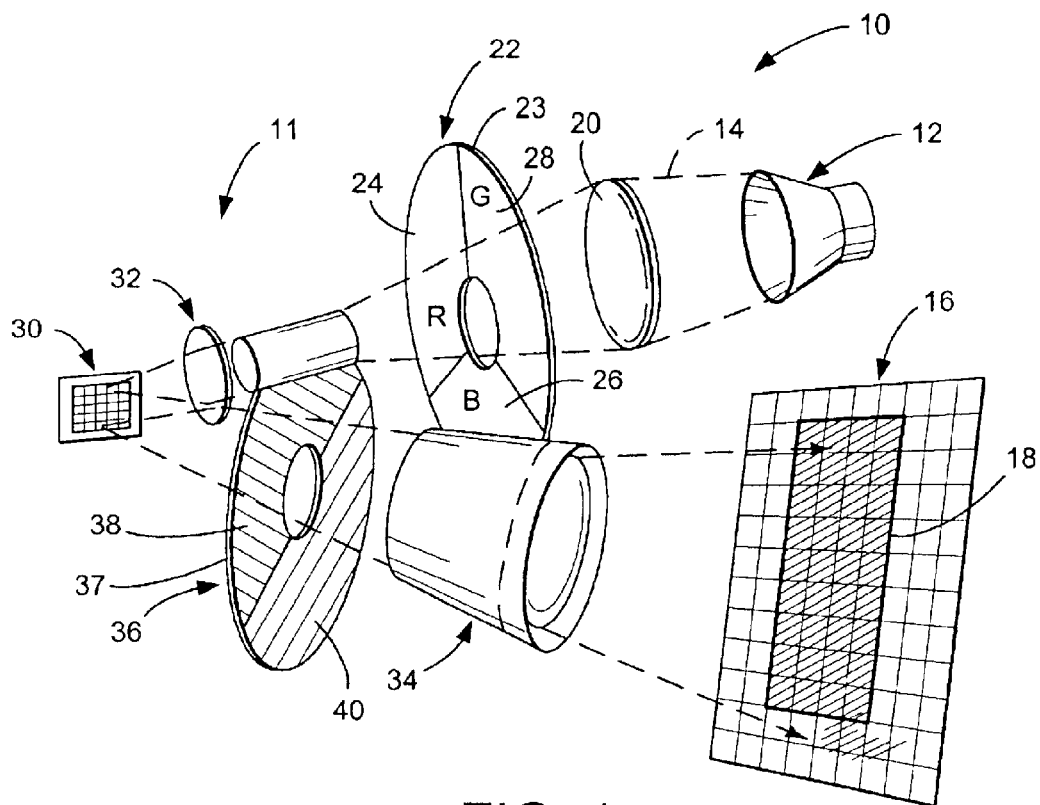
FIG. 1 is a somewhat schematic diagram of a display system having a variable focus device according to an embodiment of the present invention.

FIG. 1 illustrates, at 10, a display system that is configured to generate and display images on a screen. Display system 10 may be a rear projection display system, a front projection display system or some other suitable display system. Typically, display system 10 includes a projector 11 and a screen 16, wherein the projector is adapted to project image information onto the screen.

For example, in a rear projection display system, an image is projected via a projector onto the screen such that the image is visible by a viewer situated on the opposite side of the screen from the projector. Typically, the projector and screen are integrated in a single unit. Alternatively, in a front projection display system, the viewer typically is located on the same side of the screen as the projector. Moreover, in such a system, the projector may be spaced-apart and separate from the screen.

Projector 11 typically includes a light source or illumination source 12 configured to direct image information along an optical path 14 toward screen 16. The image information is used to produce an image 18 on screen 16. As used herein, the term image includes both still images and video images.

Illumination source 12 may be any suitable light source adapted to transmit image information to screen 16. For example, illumination source 12 may be a single beam light source such as a mercury lamp, a multiple beam light source, multiple colored lights, etc. Illumination source 12 may produce white light and/or colored light. In the depicted embodiment, light from illumination source 12 is directed through optics 20, such as a lens, onto a color light modulator 22.

Color light modulator 22 thus may separate light provided by illumination source 12 into a plurality of colors. In the embodiment shown in FIG. 1, color light modulator 22 includes a color wheel 23. Color wheel 23 has three color regions, a red region 24, a green region 28, and a blue region 26. The color wheel may be configured such that the color regions sequentially filter light from the illumination source. It should be noted that other types of color light modulators may be used, including wheels having different sizes of color regions, number of regions, and/or colors of regions. The combination of illumination source 12 and color light modulator 22 functions to produce colored light, and is effectively a type of color light source that may be implemented in display system 10.

Alternative configurations, with or without a color light modulator, similarly may be used to produce colored light. For example, in some embodiments, illumination source 12 itself may generate colored light. Specifically, illumination source 12 may include a plurality of colored lights. More specifically, an array of red, blue and green colored lights may be used as an alternative to the mercury lamp and color wheel described above. It further should be appreciated that other devices may be used to produce colored light, and are within the scope of the invention.

Light produced via illumination source 12 and color light modulator 22 may be directed onto a spatial light modulator (SLM) 30. In some embodiments, an illumination lens 32, or other optical device, may be used to focus the light onto spatial light modulator 30. Spatial light modulator 30 may be any suitable light-modulating device, such as a micromirror array (e.g., a digital micromirror device (DMD) or a digital light processor). Spatial light modulator 30 is adapted to produce modulated light that is directed onto screen 16.

Modulated light from spatial light modulator 30 may be further focused and positioned prior to impinging on screen 16. In the exemplary system, colored light, directed to screen 16, is passed through projection optics 34. Projection optics 34 may include one or more projection lenses. Typically, projection optics 34 is adapted to focus, size and position the colored light on screen 16 to generate an image 18. Moreover, and as described in more detail below, projection optics 34 may function as a variable focus device.

Referring back to FIG. 1, display system 10 further includes a time-varying focus device, or variable focus device, 36 disposed within the optical path. The variable focus device may be integrated within projection optics 34 and/or separated from projection optics 34, as shown in FIG. 1. Generally, variable focus device 36 enhances the quality of the image by changing the effective or apparent resolution of the image on the screen to a viewer. Specifically, variable focus device 36 is configured to vary the diameter of the light beam as it is projected onto screen 16. By varying a dimension or dimensions of the light beam, a corresponding image and/or image portion may be enlarged or contracted, effectively changing the image and/or image portion between a focused and an unfocused/defocused state. Specifically, and as described in more detail below, the variable focus device may be configured to temporarily enlarge individual image portions, causing the image portions to overlap, to generate a homogenous image. Stated otherwise, variable focus device 36 alters the projected light by periodically changing the focus or focal point of the light beam.

Variable focus device 36 may be any suitable device having differing optical characteristics. For example, variable focus device 36 may be a time-varying lens adapted to intermittently change the focal length of the light beam. Variable focus device 36 thus may be a diverging lens, a converging lens, or other suitable focusing or defocusing lens configured to periodically interrupt the optical path.

As described below, variable focus device 36 may be a reflective and/or a refractive lens. For illustrative purposes, in FIG. 1, an exemplary variable focus device 36 is shown as a focus wheel 37, similar to color wheel 23, described above. However, instead of having color regions, focus wheel 37 may include multiple lens regions of differing optical characteristics. For example, focus wheel 37 includes two regions, a first lens region 38 having a first optical characteristic and a second lens region 40 having a second optical characteristic. Each of the depicted lens regions is radially disposed about focus wheel 37 and is configured such that incident light sequentially impinges each lens region as the focus wheel rotates over time. It should be noted that the position and number of lens regions may vary, and thus, focus wheel 37 may have one, two, three, four or more lens regions.

As focus wheel 37 rotates, the different optical characteristic of each lens region affects the size of the projected light as it impinges the screen. For example, each lens region may have a specific curvature. As described in more detail below, the curvature of the lens may cause the incident light beam to either converge or diverge. By controlling the amount of convergence and divergence, and the direction of convergence and divergence, the resulting image or portion of the image may be sequentially focused and defocused. Somewhat surprisingly, sequentially focusing and defocusing the image or image portions may actually enhance the quality of the image.

For example, in some display systems, the spatial light modulator includes a plurality of mirrors. Each mirror typically individually directs or reflects a portion of light toward the display screen, and thereby, generates a portion of the image to be displayed on the screen. However, each mirror may be slightly spaced from its neighboring mirrors. Thus, the mirrors generate a slightly discontinuous image, formed of multiple, discrete image portions. In some display systems, the image portions may be visible to a viewer. In other words, a viewer may be able to see a division or break in the image where portions of the image are reflected from different mirrors. On the screen, the image thus may appear to have lines defining a series of discrete image portions.

Figure 2:
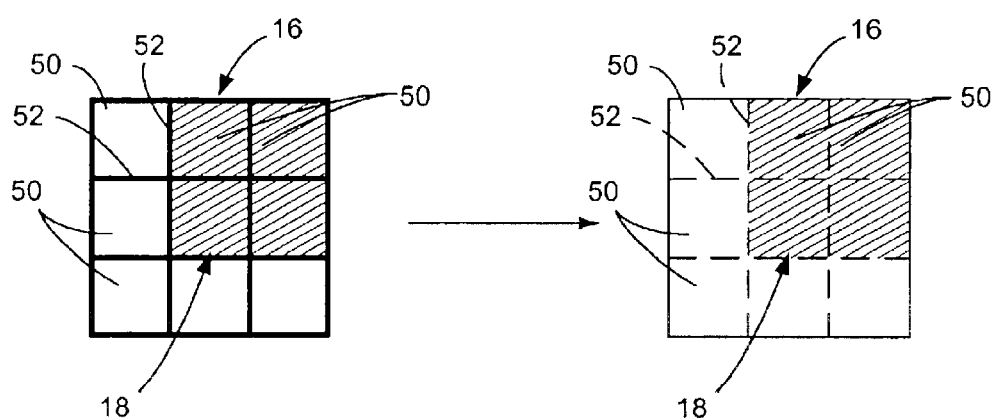
FIG. 2 is a comparison of images generated before and after implementation of the variable focus device of FIG. 1.

FIG. 2 shows a fragment of screen 16 with a representation of an image 18 as displayed both before and after implementation of a variable focus device as described herein. Image 18 may be generated, for example, via a spatial light modulator having a plurality of mirrors. As indicated previously, each mirror may produce a portion of the image. For illustrative purposes, portions of the image are generally indicated at 50. Each image portion 50 is adjacent other image portions so as to cooperatively produce image 18. Lines 52 represent the effect of reflection of discrete image portions from multiple mirrors. As shown to the left in FIG. 2, before implementation of the variable focus device described herein, lines 52 are visible to a viewer. Although illustrated as solid lines, lines 52 are typically dark spaces that outline each image portion 50, thereby creating a "screen door effect." In other words, image 18 may appear tiled.

The use of variable focus device 36 may reduce or eliminate the visibility of lines 52. By changing the size of the light beam reflected from each mirror, there may be a reduction in the spacing between adjacent image portions 50. Overlap between the individual mirrors may even be possible. Such spacing reduction may occur by effectively defocusing the image for a brief period of time and then refocusing the image to preserve the desired focused-image characteristics. Thus, as the light from each mirror is passed through variable focus device 36, each image portion 50 is successively focused and defocused, blending the image portions together so as to create a more homogenous image. In other words, the image portions are rapidly expanded and contracted as the reflected light is passed through different lens regions of variable focus device 36. By varying the size and intensity of the image portions, lines 52 may become less prominent to a viewer.

Also, sharp edges of image 18 typically remain clear to a viewer. Specifically, the image may be focused and defocused so rapidly that a viewer does not perceive the change in the focus of the image. Additionally, in some embodiments, the image portions may be selectively focused and defocused to maximize blending in some parts of the image and minimize blending in other parts of the image for example, parts that contain predominantly text.

In some embodiments, individual portions of the image may actually be enhanced. For example, the spatial light modulator may be adapted to modulate the light into a plurality of discrete light beams. Each modulated light beam may be configured to produce a light spot on the screen of a first size. The variable focus device may be configured to selectively vary the size of the light spot on the screen between the first size and a second size. These light spots may have different optical characteristics or visual characteristics. Such a configuration may be used to enhance the apparent resolution of the image to a viewer.

Variable focus device 36 further may be used to control intensity. In typical display systems, intensity may be controlled by turning the micromirrors on and off. Turning on and off of the micromirrors, however, may result in a shimmering effect that may be observable by a viewer. Use of a variable focus device provides an alternate method of controlling the intensity of the image. Specifically, a variable focus device may be configured to selectively enlarge some frames of an image. These enlarged images may be lower resolution images employing fewer than all of the micromirrors. Nevertheless, with proper enlargement of the image frames, such image frames may appear as low intensity, low resolution image frames. Thus, by interleaving the low intensity, low resolution image frames with higher intensity, higher resolution image frames (e.g., using the variable focus device), the shimmering effect may be eliminated.

Figure 3:
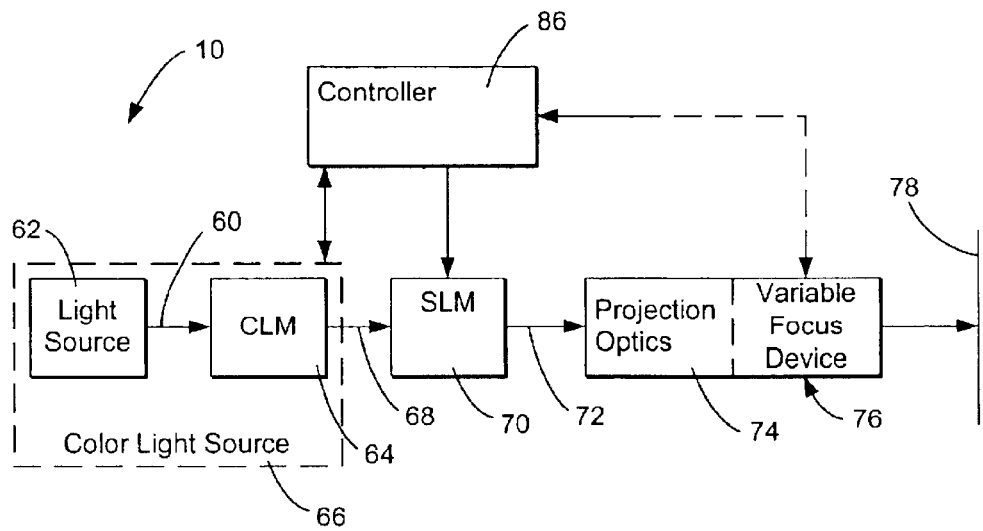
FIG. 3 is a block diagram of a display system wherein a variable focus device is integral with projection optics of the display system according to another embodiment of the present invention.
Figure 4:
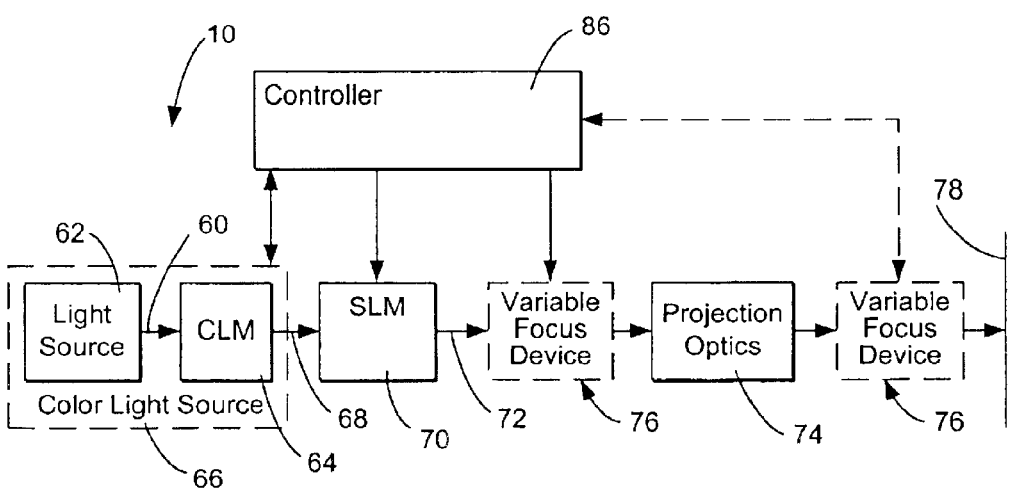
FIG. 4 is another block diagram of a display system, showing alternative positions of a variable focus device.

FIGS. 3 and 4 illustrate alternative embodiments of display system 10. As in the display system shown in FIG. 1, light 60 in FIGS. 3 and 4 is produced via an illumination source or light source 62. Light source 62 may direct light 60 through color light modulator 64 to produce colored light 68. It should be appreciated that light source 62 may be configured to produce colored light independent of the use of color light modulator 64. Thus, any suitable color light source 66 may be used to produce colored light 68. Colored light 68 may be further directed onto spatial light modulator 70, which produces modulated colored light 72. Modulated colored light 72 may then pass through projection optics 74, through variable focus device 76, and onto screen 78.

As shown in FIG. 3, variable focus device 76 may be integrated within projection optics 74. Alternatively, as shown in FIG. 4, variable focus device 76 may be independent of the projection optics, and placed prior to and/or after projection optics 74 in the light path. Regardless of the position of variable focus device 76, light that passes through device 76 may be modified to produce alternatively focused and defocused images or portions of images on screen 78.

Display system 10 may include a controller 86 configured to manage the generation of an image. Specifically, controller 86 may manage color light source 66, spatial light modulator 70, and/or variable focus device 76. For example, in some embodiments, controller 86 is adapted to receive color image information from color light modulator 64 and control operation of spatial light modulator 70 based on the color information to generate an image. In some embodiments, controller 86 may control the speed and position of a color wheel. Alternatively, in other embodiments where the color light source 66 employs plural lights, controller 86 may directly control color light source 66.

Controller 86 further may control variable focus device 76 in combination with spatial light modulator 70 to modulate the image and/or portions of the image. For example, in FIG. 3, controller 86 may control variable focus device 76, such that the effect of a variable focus device is realized on the screen. Controller 86 may rapidly alter variable focus device 76 between differing focus characteristics, thereby causing the image or portions of the image to shift between a focused and defocused state. Similarly, in FIG. 4, controller 86 may control variable focus device 76 such that the displayed image or portions of the image shift rapidly between a focused and defocused state. Alternatively, variable focus device 76 may be independently managed by a discrete controller (not shown).

In the exemplary embodiments, light is transmitted to the spatial light modulator, which includes a plurality of micromirrors that correspond to image portions of the screen. Controller 86 may be configured to independently actuate each micromirror to control the color and intensity of the corresponding image portion on the screen. Additionally, controller 86 may manage the variable focus device, as described above, so that select portions of the image are focused and defocused. Such control may enhance quality of the image, by blending of colors, while maintaining sharp edges and light/dark contrasts within the image.

Figure 5:
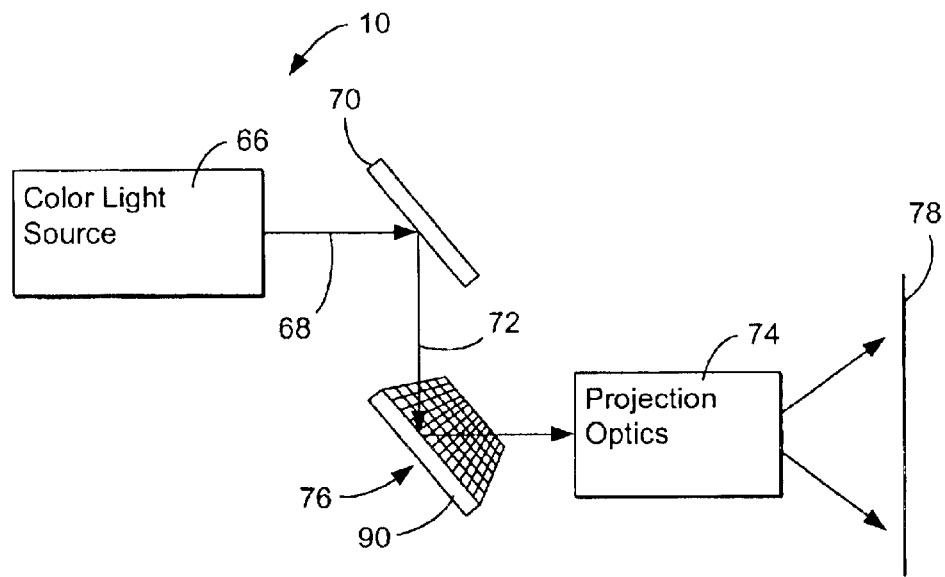
FIG. 5 is a schematic representation of a display system showing use of a variable-curvature mirror as a variable focus device according to another embodiment of the present invention.

FIG. 5 illustrates the use of variable focus device 76 in display system 10 where variable focus device 76 is positioned after spatial light modulator 70 and prior to projection optics 74. As briefly indicated above, many different mechanisms may be used to provide the effect of variable focus device 76. For example, the variable focus device may include one or more reflective lens, such as mirrors, and/or one or more refractive lens, which are configured to bend or diverge incident light as it passes therethrough.

In FIG. 5, light 68 may be produced via a color light source 66. Light 68 may be directed toward a spatial light modulator 70, and the resulting modulated light 72 further directed onto variable focus device 76, through projection optics 74, and onto screen 78. FIG. 5 illustrates a variable focus device 76 in the form of deformable or variable-curvature mirror array 90. Variable-curvature mirror, as used herein, includes any mirror or surface that may be varied over time to change the light reflection. The reflected light generates an image or portion of an image that alters between a focused and unfocused state.

In another embodiment, the spatial light modulation itself may be formed from an array of deformable mirrors, thereby integrating the variable focus device with the micromirror array of the special light modulator.

Any suitable variable-curvature mirror may be used, including but not limited to, deformable mirrors, adaptive optical elements, bimorph mirrors, etc. In some embodiments, a variable-curvature mirror may include a plurality of electrically addressable actuators that controllably deform the surface of the mirror. The actuators may be individually actuated such that portions of the image may be selectively focused and defocused.

Figure 6:
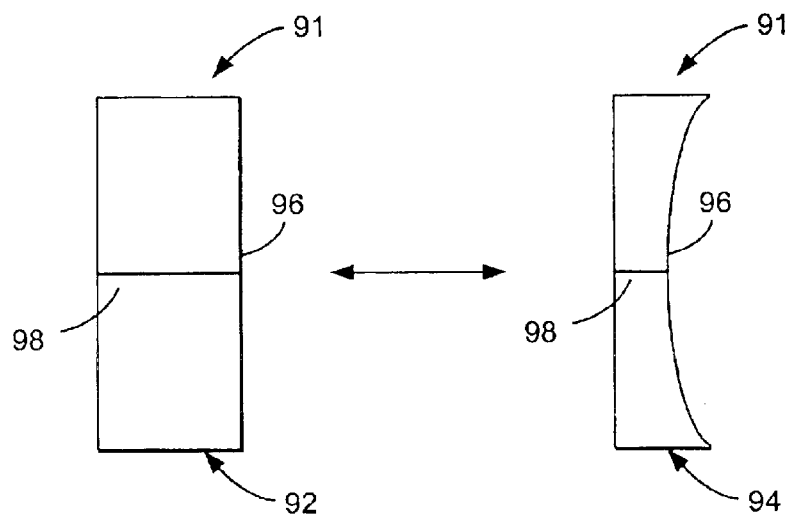
FIG. 6 is a side view of the variable-curvature mirror shown in FIG. 5, demonstrating operation thereof.

FIG. 6 illustrates an exemplary portion of a variable-curvature mirror 91 which may be varied between a flat state, indicated at 92, and a curved state, indicated at 94. Variable-curvature mirror portion 91 may include a reflective surface 96 that is capable of alternating between a flat configuration and at least one curved configuration. Surface 96 is typically coated with a reflecting coating and may be coupled to a layer of a piezo-electric material or piezo element 98. A voltage may be applied to piezo element 98, causing the piezo element to expand/contract laterally. Such expansion/contraction results in the entire structure bending, thereby changing the surface curvature of variable-curvature mirror portion 91. It should be appreciated that variable-curvature mirror array 90 may have a plurality of individually-controlled piezo elements and multiple mirror portions 91. By applying different voltages to different piezo elements, the shape of the mirror may be controlled.

In operation, incident light impinges surface 96 of variable-curvature mirror array 90. As described above, the curvature of surface 96 may be controlled by piezo element 98 within variable-curvature mirror array 90. At times, surface 96 may be substantially flat. At other times, surface 96 may be curved to varying degrees. The curvature affects the light as it impinges upon the surface, thereby altering the focus of the image on the screen. Thus, depending on the configuration of variable-curvature mirror array 90, an image or a portion of an image is generated on screen 78 in either a focused or unfocused state.

As indicated, variable focus 76 device may utilize bimorph mirror elements. Each bimorph mirror element, it will be appreciated, may be formed via a multilayer structure including a layer of piezoelectric material and a layer of passive material. An exposed surface of this material may be coated with a reflective material. Upon activation (via a voltage) of the piezo electric material, the curvature of the mirror element changes, for example, from a flat to a curved state.

FIGS. 7–10 show alternative embodiments for variable focus device 76. Specifically, FIGS. 7–10 illustrate a plurality of focus wheels or spinning lenses that may be implemented within a display system. Each depicted focus wheel may function as a diverging lens. Each focus wheel thus may be configured to vary the focus of the incident light over time as it impinges the screen. The depicted focus wheels include lens regions which differ in curvature and which are successively positioned within the optical path as the wheels rotate or spin.

Figure 7:
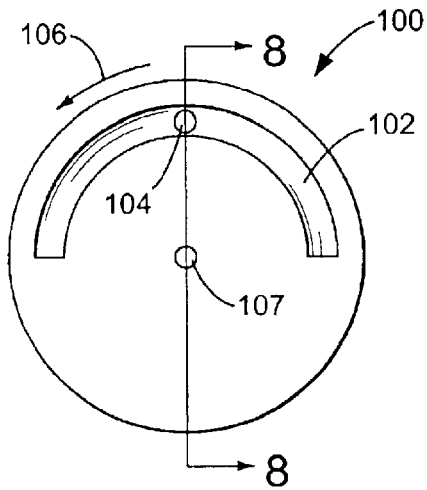
FIG. 7 is a front view of an exemplary focus wheel that may be used as a variable focus device according to yet another embodiment of the present invention.
Figure 9:
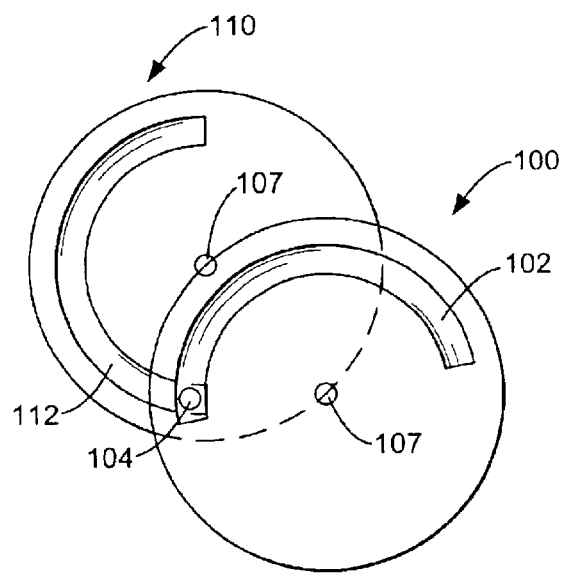
FIG. 9 is a front view of two focus wheels used in combination as a variable focus device, where a first focus wheel includes a curved lens region that causes an incident light beam to laterally diverge and a second focus wheel includes a curved lens region that causes the incident light beam to vertically diverge.
Figure 8:
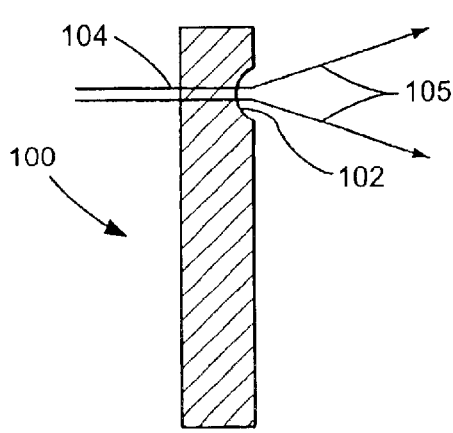
FIG. 8 is a cross-sectional view of the focus wheel shown in FIG. 7 taken along lines 8—8 in FIG. 7, and showing incident light diverging as the light passes through a curved lens region.

FIG. 7 illustrates a focus wheel 100 adapted to be disposed within the optical path. Focus wheel 100 includes a lens region 102 that extends arcuately along a portion of the lens. Although illustrated as extending half-way around the lens, it should be noted that lens region 102 may extend any distance. As best shown in the cross-section of focus wheel 100 in FIG. 8, lens region 102 is a concave region that is configured to cause divergence of the incident light. Specifically, incident light 104 diverges as it passes through lens region 102, as indicated at 105. Depending on the configuration of the lens region, the lens region may cause the light beam to laterally diverge, vertically diverge, or both.

In operation, focus wheel 100 may rotate about axis 107 as indicated by arrow 106. When light beam 104 passes through lens region 102, the light diverges vertically, thus affecting the focus of the light on the screen. A second focus wheel 110, shown in FIG. 9, substantially identical to focus wheel 100, may be used alone, in combination with, or in sequence with, focus wheel 100 with a second lens region 112 configured to cause horizontal divergence of an incident light beam 104. The two wheels may be positioned, such that in combination, a light beam may be vertically and horizontally diverged.

Figure 10:
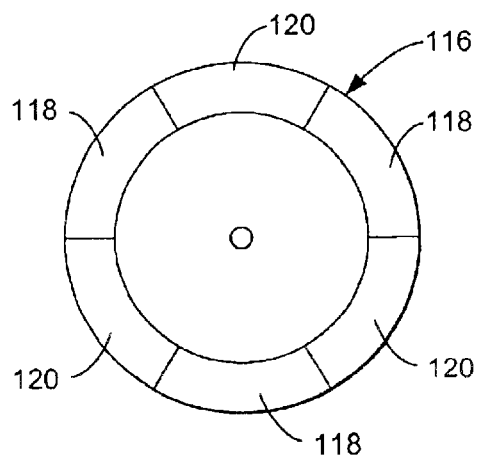
FIG. 10 is a front view of another exemplary focus wheel having a plurality of lens regions according to still another embodiment of the present invention.
Figure 11:
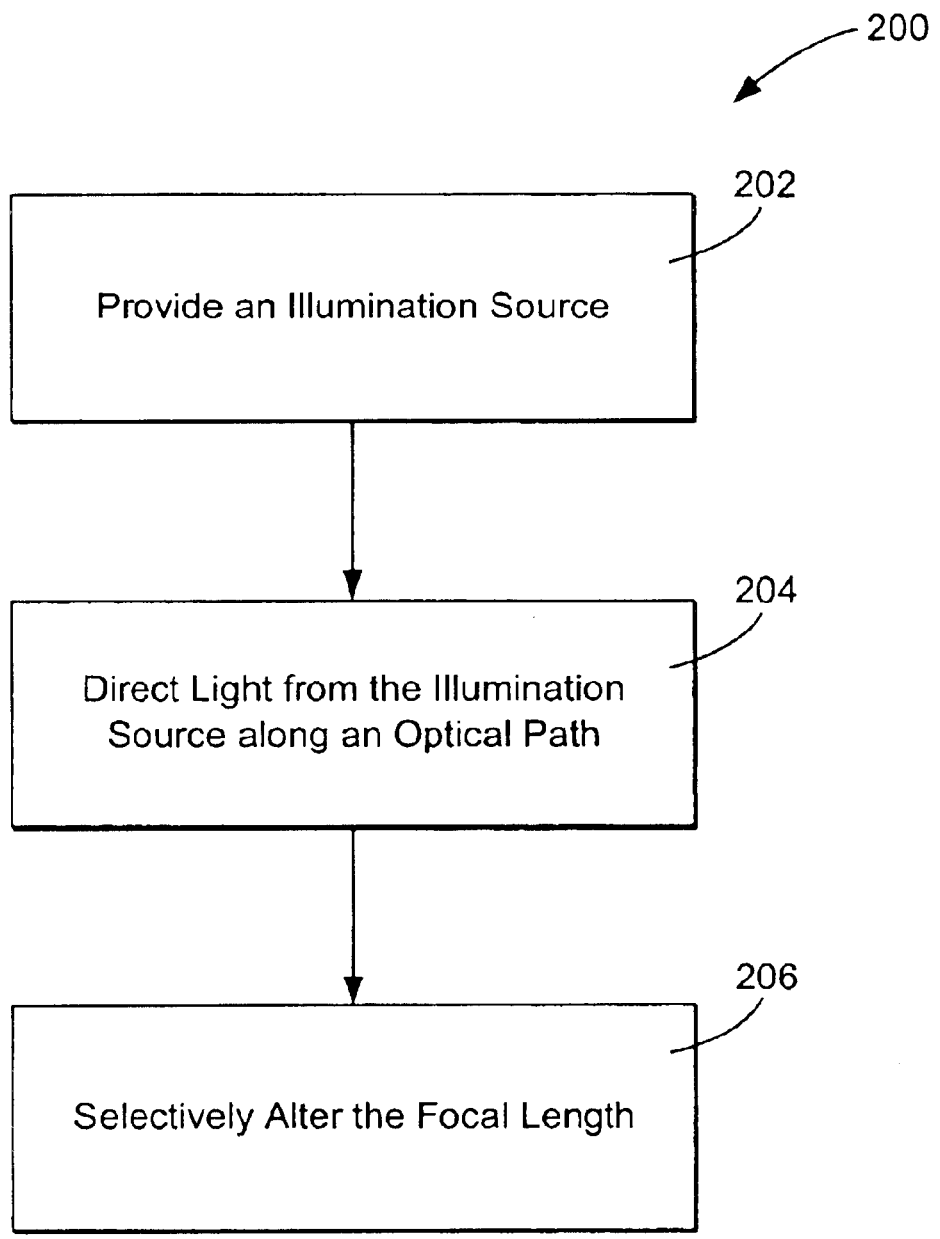
FIG. 11 is a method for enhancing the quality of an image on a screen according to an embodiment of the present invention.

FIG. 10 illustrates another embodiment for variable focus device 76. In the depicted embodiment, another focus wheel 116 is illustrated having a plurality of lens regions 118 and 120. The two lens regions 118 and 120 may have differing curvatures. Such curvature may affect the degree of divergence or convergence of the light as the light is passed through the different lens regions. It should be noted that any number of lens regions may be employed.

In some embodiments, lens region 118 may have substantially little or no curvature, while lens region 120 is sharply curved. As focus wheel 116 rotates, light is sequentially passed through the different lens regions 118 and 120. By controlling the rotation of focus wheel 116, it is possible to selectively focus and defocus the image or portions of the image. Thus, when the lens region that causes a high degree of divergence is within the optical path, the light spot size on the screen is enlarged. Such enlargement may improve images or portions of images that require gradual shading and/or blending. Similarly, when the lens region that causes a minimal degree of divergence is within the optical path, the light spot size remains smaller. The smaller light spot enables edges, such as text, to be sharply focused, thus making such edges distinct and clear.

A method of enhancing the quality of an image on a screen in the display system discussed above is shown generally at 200. Method 200 typically includes, at 202, providing an illumination source configured to generate a light beam. The method further includes, at 204, directing the light beam from the illumination source along an optical path and onto a screen. At 206, the focal length of the light beam is selectively altered to intermittently change at least a portion of the image on the screen. By changing the focal length, the focal point or focus of a corresponding image portion on the screen is altered. In other words, focused and defocused images may be interleaved on the screen. By rapidly and sequentially alternating between different focal lengths, each image portion may be brought into and out of focus. A temporarily defocused image portion is configured to overlap with an adjacent image portion and causes the overall image to appear blended. Such blending improves the quality of the image to a viewer.

While various alternative embodiments and arrangements of a system for enhancing the quality of an image have been shown and described above, it will be appreciated by those of skill in the art that numerous other embodiments, arrangements, and modifications are possible and are within the scope of the invention. In other words, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding two or more such elements.

What is claimed is:

1. An image projection system configured to enhance quality of an image on a screen, the system comprising:
   an illumination source configured to produce light and direct light along an optical path to produce sequential image frames; and
   a time-varying focus device disposed in the optical path and configured to periodically alter focal length of sequential image frames to enhance quality of the image on the screen.

2. The image projection system of claim 1, wherein the time-varying focus device is configured to periodically diverge light of sequential image frames.

3. The image projection system of claim 1, wherein the time-varying focus device is configured to periodically converge light of sequential image frames.

4. The image projection system of claim 1, wherein the time-varying focus device is configured to iteratively diverge light and converge light of sequential image frames.

5. The image projection system of claim 1, wherein the time-varying focus device includes a reflective lens.

6. The image projection system of claim 1, wherein the time-varying focus device is a variable-curvature mirror.

7. The image projection system of claim 6, wherein the variable-curvature mirror employs a piezo element to alter curvature of the mirror.

8. The image projection system of claim 6, wherein the variable curvature mirror is a bimorph mirror.

9. The image projection system of claim 6, wherein the variable-curvature mirror is configured to alternate between a generally planar state and a generally curved state.

10. The image projection system of claim 1, wherein the time-varying focus device includes a refractive lens.

11. The image projection system of claim 1, wherein the time-varying focus device is a focus wheel having regions of differing focus characteristic.

12. The image projection system of claim 11, wherein the focus wheel includes at least one curved lens region.

13. The image projection system of claim 1, wherein the time-varying focus device includes at least two focus wheels with a first focus wheel configured to cause the incident light beam to horizontally diverge and a second focus wheel configured to cause the incident light beam to vertically diverge.

14. The display system of claim 13, wherein the variable focus device is a focus wheel having regions of differing optical characteristics, the focus wheel being rotated to sequentially place such regions of differing optical characteristics into the optical path.

15. The image projection system of claim 1, wherein the time-varying focus device is configured to selectively periodically alter focal length of sequential image frames to change intensity of the image on the screen.

16. A display system configured to enhance the quality of an image on a screen, the system comprising:
   an illumination source configured to direct light along an optical path;
   a spatial light modulator adapted to modulate the light into a plurality of discrete light beams, each light beam configured to project a light spot on the screen of a first size; and
   a variable focus device disposed in the optical path and configured to periodically vary size of light spots on the screen between the first size in a first image frame and a second size in a second image frame such that a corresponding image portion on the screen rapidly and repeatedly alternates in sequential image frames between a focused state and a defocused state to enhance the appearance of the image.

17. The display system of claim 16, wherein the variable focus a deformable mirror array.

18. The display system of claim 17, wherein the spatial light modulator includes the variable focus device.

19. The display system of claim 17, wherein the deformable mirror array is an array of bimorph mirrors.

20. A method for enhancing the quality of an image on a screen, the method comprising:
   providing an illumination source configured to generate a light beam;
   directing the light beam from the illumination source along an optical path to produce image frames on a screen, wherein each image frame has a focal length; and
   periodically altering the focal lengths of the image frames to produce repeatedly interleaved focused and defocused image frames on the screen, wherein periodically altering the focal lengths includes altering the focal length of sequential image frames.

21. A method for enhancing the quality of an image on a screen, the method comprising:
   providing an illumination source configured to generate a light beam;
   directing the light beam from the illumination source along an optical path to produce image frames on a screen, wherein each image frame has a focal length; and
   periodically altering the focal lengths of the image frames to produce repeatedly interleaved focused and defocused image frames on the screen, wherein periodically altering the focal lengths includes rapidly and repeatedly focusing and defocusing sequential image frames.

22. A display device configured to display an image on a screen, the system comprising:
   illumination means for producing a light beam;
   light modulating means for directing the light beam onto a screen to form an image; and
   variable focus means for varying size of the light beam such that the image on the screen repeatedly alternates between a focused and an unfocused state in sequential image frames.

23. A method for enhancing the quality of an image on a screen, the method comprising:
   providing an illumination source configured to generate a light beam; directing the light beam from the illumination source along an optical path to produce images on a screen, wherein each image has a focal length; and
   rapidly and repeatedly altering the focal lengths of the images to produce interleaved sequentially focused and defocused images on the screen.

* * * * *